United States Patent [19]

Venable, Jr.

[11] Patent Number: 4,664,863

[45] Date of Patent: May 12, 1987

[54] HEAT RESISTANT PROCESS GAS LINE

[75] Inventor: Charles R. Venable, Jr., Bartlesville, Okla.

[73] Assignee: Phillips Petroleum Company, Bartlesville, Okla.

[21] Appl. No.: 312,490

[22] Filed: Oct. 19, 1981

[51] Int. Cl.[4] .......................................... B32B 31/06
[52] U.S. Cl. .................................... 264/262; 264/59; 264/60; 264/221; 264/261; 264/263; 264/269; 264/317
[58] Field of Search ................. 264/60, 221, 261, 263, 264/269, 271.1, 275, 279, 59, 262, 317

[56] References Cited

U.S. PATENT DOCUMENTS

| | | | |
|---|---|---|---|
| 1,778,419 | 10/1930 | Connor | 264/225 |
| 2,367,809 | 1/1945 | Stein | 264/279 |
| 3,223,539 | 12/1965 | Hyde | 501/124 |
| 3,456,690 | 7/1969 | Weid | 264/60 |
| 3,714,971 | 2/1973 | Venable | 264/60 |
| 3,937,781 | 2/1976 | Allen | 264/269 |
| 4,215,088 | 7/1980 | Ardory | 264/60 |
| 4,224,686 | 1/1981 | Scott | 264/65 |
| 4,285,896 | 8/1981 | Miller | 264/269 |

OTHER PUBLICATIONS

Venable, "Refactory Requirements for Ammonia Plants", *Cer. Bull.*, 48, (12), pp. 1114–1117, (1969).

Dial, "High Alumina Refractory Materials for Gas Reforming", (1967).
Am. Concrete Institute Rept. on "Refactory Concrete", p. 190.

*Primary Examiner*—Jan H. Silbaugh
*Assistant Examiner*—Harold Y. Pyon
*Attorney, Agent, or Firm*—French and Doescher

[57] ABSTRACT

A method of forming a heat resistant gas transfer line. The line includes a metal outer shell, a tubular inner liner formed of a plurality of prefired refractory rings joined together by shiplap joints having expansion gaps, and an intermediate liner including bubble alumina concrete filling the annular space between the inner liner and the outer shell. The method includes placing on the inside lower surface of the outershell a plurality of bubble alumina concrete forms capable of supporting the refractory rings in the desired location within the outer shell, securing decomposable rings to the refractory rings in the area where the shiplap joints are to be so that a suitable expansion gap will be provided in the shiplap joints when the combustible rings are destroyed, assembling the refractory rings having the decomposable rings secured thereon on the concrete forms to form the tubular inner liner, filling in the annular area ebtween the inner liner and the outer shell with bubble alumina castable, curing the castable to form bubble alumina concrete, and destroying the decomposable ring by combustion.

3 Claims, 4 Drawing Figures

HEAT RESISTANT PROCESS GAS LINE

BACKGROUND

This invention relates to transfer lines that can be used for conveying high temperature gases.

In many operations such as reforming, there are conduits or lines that are to convey high temperature gases. In the past, these transfer lines have typically been comprised of a high pressure resistant outer shell, a metal inner lining, and intermediate lining of insulating concrete. At temperatures in the range of 1375° to 1825° F., such lines are subject to deterioration and failure. Particularly at the higher temperatures metal linings, even those of stainless steel, are known to be especially subject to warpage and deformation which can be followed by erosion of the insulating layer and in turn to possible rupture of the outer pressure shell.

An object of the present invention is to provide an improved process gas transfer line that has greater resistance to failure and that can be installed within in existing plants with a minimum amount of modification of the plant.

In another aspect, the present invention relates to a method for forming such a gas process transfer line.

In still another aspect, the present invention relates to an ammonia plant having the improved transfer line as the transfer line between the secondary reformer and the waste heat boiler.

SUMMARY OF THE INVENTION

In accordance with the present invention, there is provided a heat resistant gas transfer line comprising a metal outer shell; an inner liner comprising a plurality of refractory rings having on opposite ends thereof male and female shiplap flanges, said rings being joined together by forming shiplap joints with adjoining rings, said refractory rings having expansion gaps in the shiplap joints; and an intermediate liner comprising bubble alumina concrete filling the annular space between said inner liner and said outer shell.

The inventive gas process transfer line may be formed by placing on the inside lower surface of the outer shell a plurality of bubble alumina concrete forms capable of supporting the refractory rings, securing decomposable rings to the refractory rings so that a suitable expansion gap will be provided in the shiplap joint when the combustible rings are destroyed, assembling the thus prepared refractory rings on the concrete forms, filling in the annular area between the inner liner and the outer shell with bubble alumina castable, curing the castable, and destroying the decomposable rings.

DETAILED DESCRIPTION OF THE INVENTION

Figure 1:
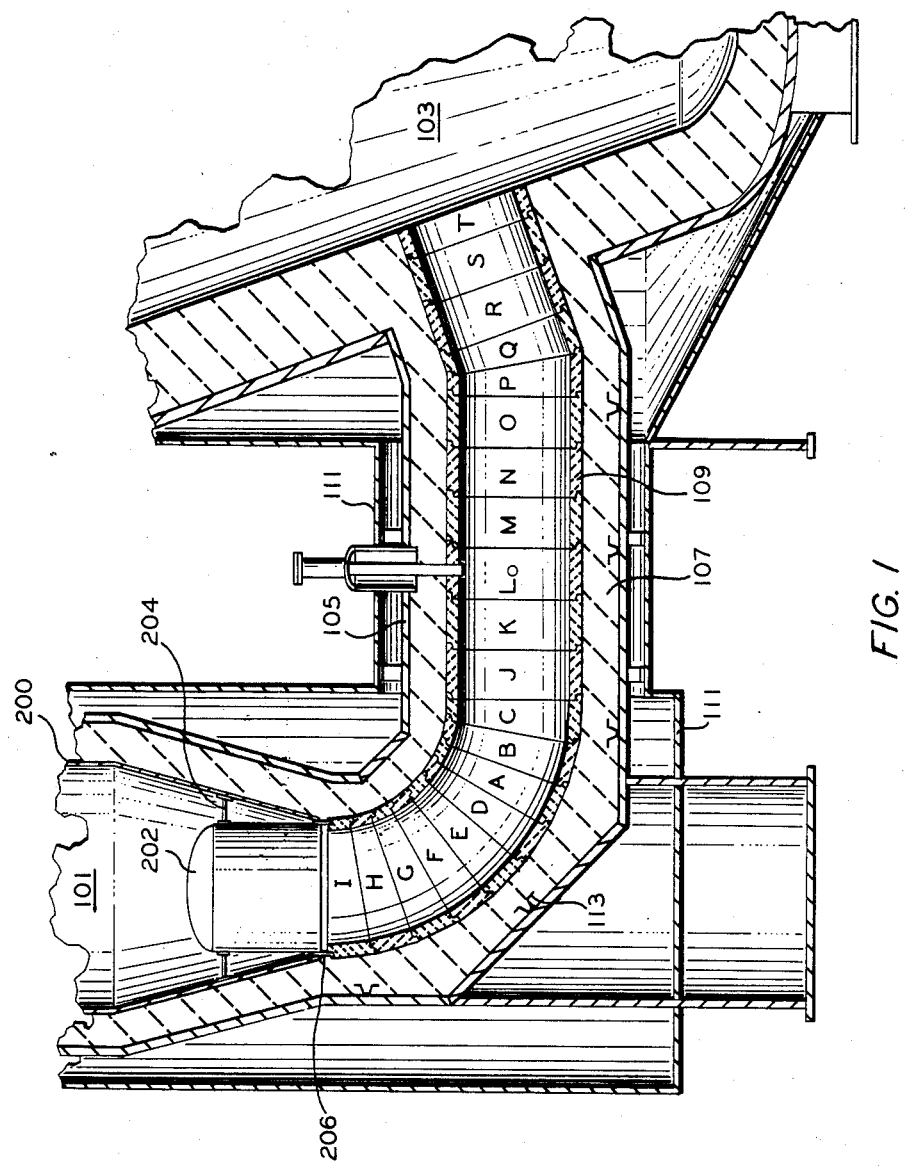
FIG. 1 is a cross-sectional side view of illustrating the lower portion of a secondary reformer, the lower portion of a waste heat boiler, and a gas transfer line connecting the two, where the gas transfer line has the features of the present invention.
Figure 2:
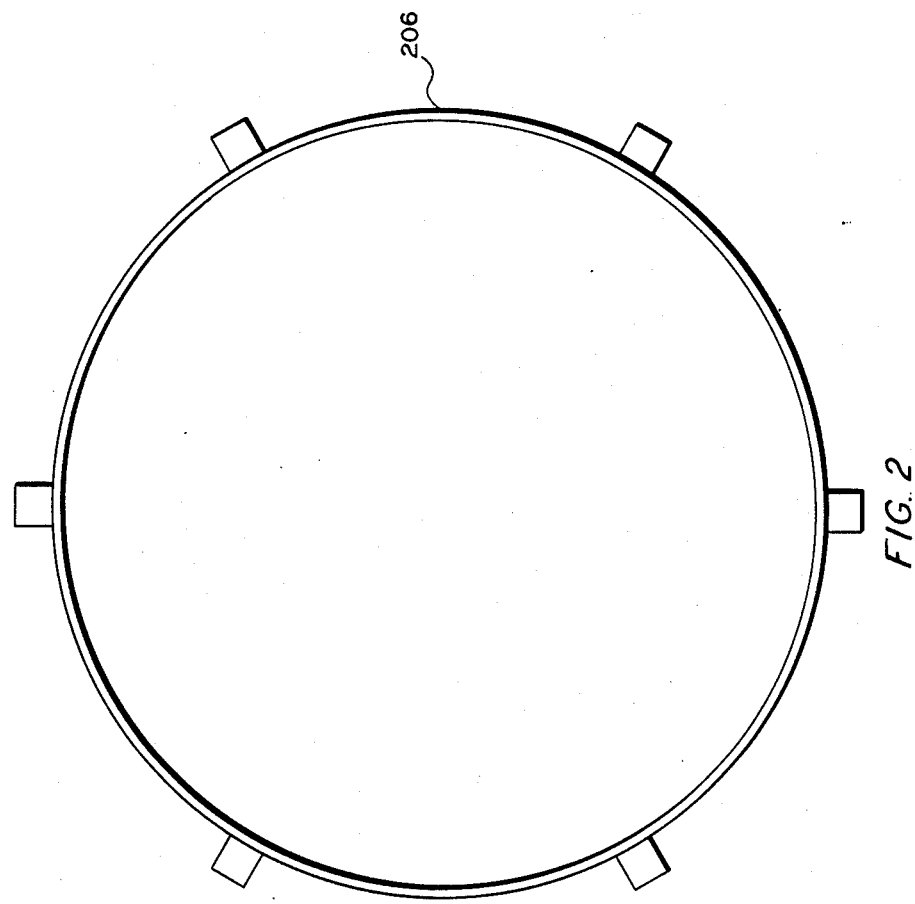
FIG. 2 is a top view of sleeve 206.

A typical installation employing the present invention is illustrated in FIG. 1 in which the lower portions of a waste heat boiler 101 and a secondary reformer 103 are shown. The waste heat boiler and the secondary reformer are connected via a gas transfer line comprising a metal outer pressure shell 105, an inner liner 109, and an intermediate liner 107. As is typical in many ammonia synthesis plants, the waste heat boiler, the secondary reformer, and the gas transfer line are enclosed within a water jacket shell 111.

The inner liner 109 consists of a plurality of refractory rings which can be formed of any suitable refractory. Preferably, the rings are 99 weight percent $Al_2O_3$. The various rings, labelled I-T, in the drawing, are joined together by shiplap joints formed by male and female shiplap flanges existing on opposite ends of the rings. Each of the shiplap joints has an expansion gap. The expansion gaps are generally of a dimension in the range of about 3/32nd to about ⅛th inch.

The intermediate liner 107 comprises bubble alumina concrete filling the annular space between the inner liner 109 and the outer shell 105. Any suitable bubble alumina can be employed. Generally, the bubble alumina concrete is formed from a cement comprising bubble alumina and calcium aluminate. Preferably, the cement is reinforced with metal fibers, typically about 5 weight percent based on the weight of the castable bubble alumina cement. Generally, metal fibers of stainless steel about 1 inch in length are quite suitable. Examples include those fibers sold commerccially under the names Ribtec or Meltex. A suitable cement is Alfrax B1 57 Castable produced by the Carborundum Company. Preferably, castable is employed that will produce a bubble alumina concrete which after firing at 1800° F. will have a density in the range of about 70 to 80 pounds per cubic foot.

Preferably, there are also provided a plurality of refractory anchors 113 spaced along the length of the lower inner surface of the outer shell.

In the waste heat boiler 101, there is provided a cone shroud 200, an inlet gas distributor 202, a gas distributor support ring 204, and a sleeve 206.

The present invention is particularly suitable for use in replacing the old metal linings in plants that have been in operation for some time. A description of one such installation will follow.

The temperature and pressure connections on the existing gas transfer line are removed and saved for reuse. A section of the water jacket 111 is removed between the waste heat boiler and the secondary reformer above the gas transfer line. A section is then cut out of the exposed pressure shell to give an open area large enough for the work to be performed that will be described shortly. The removed section of the pressure shell is split on both sides to result in a top section and a bottom section. The cone shroud of the waste heat boiler is cut loose from the elbow of the existing inner liner of the transfer line. The pre-existing metal inner liner of the transfer line and the surrounding insulation is then removed. Also pre-existing refractory in the bottom of the waste heat boiler is removed in an amount necessary to allow the pouring of the castable to be described below. After the innner liner and insulation of the transfer line have been removed, the inner surface of shell 105 is cleaned of scale and corrosion products that may be present. Refractory anchors 113 are secured if none were present.

Figure 3:
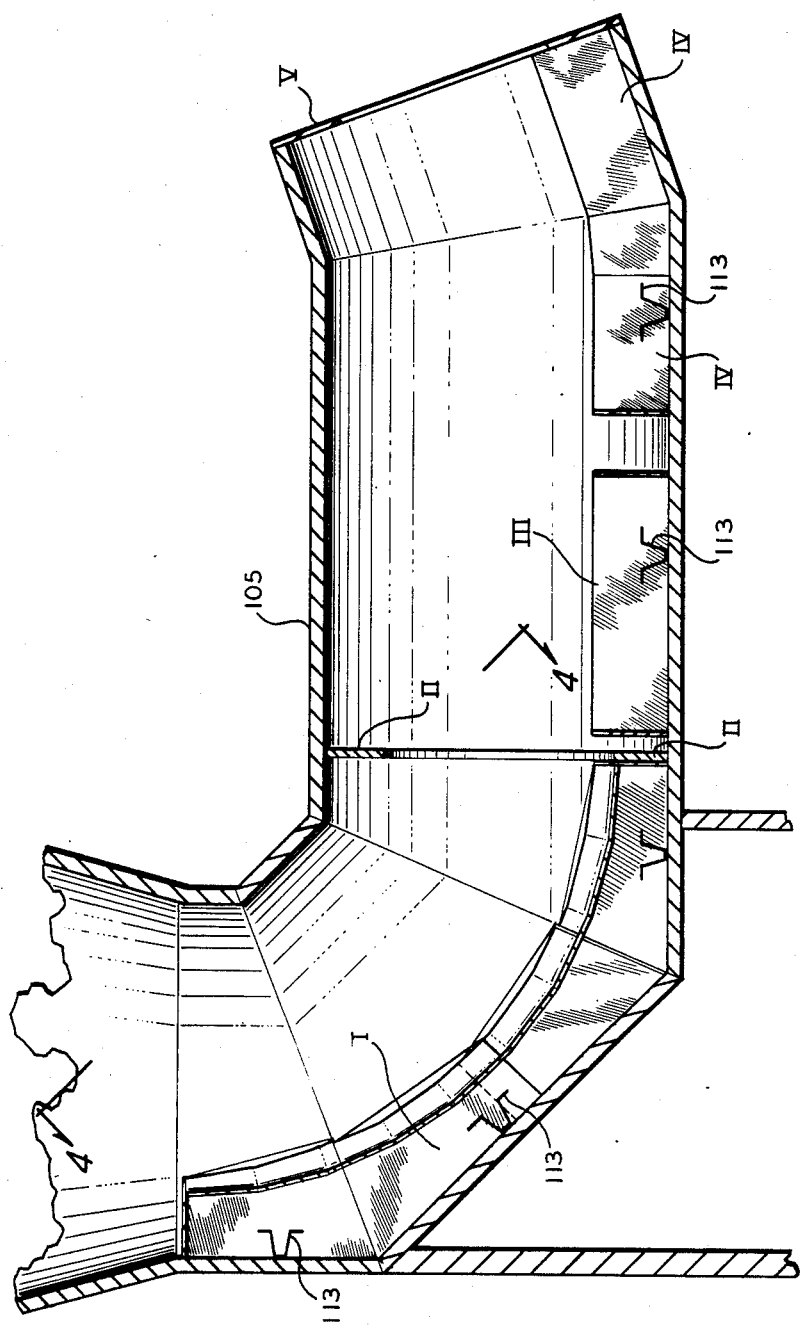
FIG. 3 is a cross-sectional side view of the outer shell of the gas transfer line with forms placed therein for use in forming supports for the refractory rings.
Figure 4:
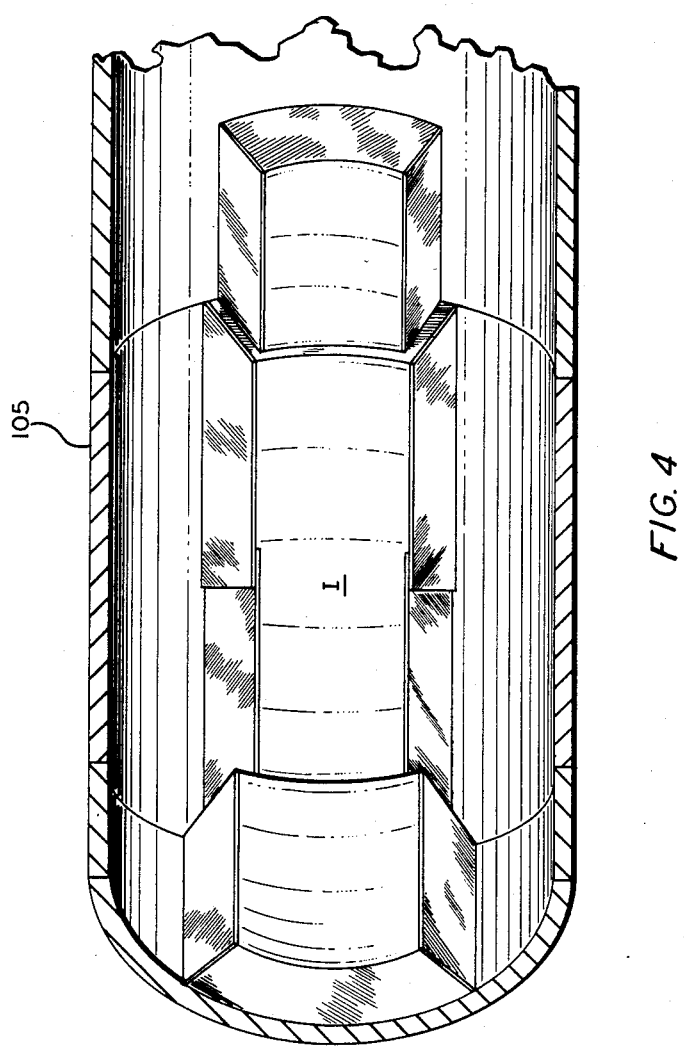
FIG. 4 is a top view of the forms used in the waste heat boiler end of the transfer line with the upper portion of the transfer line cut away.

The bottom section of the shell 105 that was cut out or a replacement therefor is welded back in place. Forms I, III and IV are lightly greased on the inside and then secured inside shell 105 as shown in FIG. 3. Tack welding can be employed to secure the forms. Form 1 includes a tapered group of sections, the upper surface of which includes a curved plate having a radius so that the rings will be supported in their proper positions on the resulting concrete platforms. After Form 1 is in place, castable containing metal fiber is added to Form I from inside the waste heat boiler. Tamping and internal vibration are used to insure conformity of the concrete platforms to the shape of the mold.

Castable with metal fiber is also then added to Forms III and IV, which are open topped forms. Tamping and vibration are used in the manner known in the art to eliminate voids and air pockets. A special screed bar is used to form the needed concave radius on the upper surface of the refractory concrete platforms.

The castable is allowed to harden and then Form I is carefully removed. Working from the bottom of the 90° elbow rings A, B, and C are set in place. These rings and all the rings hereafter described include a decomposable water resistant ring secured to the male flange. Such decomposible rings can be readily made from cardboard that has been painted with shellac or the like.

Form II, a donut shaped end plate is greased lightly and then secured as shown by tack welding. Refractory rings D-I are then installed. Then bubble alumina cement containing metal fiber is used to fill the annular space between the installed refractory rings and the shell 105. After the castable has set and hardened, Form II is removed.

Refractory lining of the secondary reformer around the transfer line is removed to form an opening about the same diameter as the inner diameter of shell 105. Forms III and IV are then removed. Shapes J thru R are then installed. In the embodiment illustrated shapes J and N are of such a length that they "bridge across" the concrete platforms. Shape T is of dimensions such that when all the shapes are secured, the butt end of shape T having no shiplap flange will be approximately flush with the inside refractory surface in the secondary reformer.

Two 5 inch diameter pour holes are cut in the top section of the removed shell section to provide pour holes for bubble alumina castable. The top section of the removed shell section is then welded back in place.

Donut shaped Form V is lightly greased and secured by tack welding as shown in FIG. 3, i.e., at the intersection of the transfer line and the reformer shell. Then the annular space between the inner liner and the shell is filled with bubble alumina-castable cement containing metal fibers. Tamping and vibration being used as before.

After the installed castable has hardened and set, Form V is removed and holes are drilled through the inner liner and the intermediate liner to allow insertion of the temperature and pressure connections. The pour hole segments of the pressure shell are reinstalled by welding.

A mandrel is formed that will just slide into installed shapes Q and R. Preferably, the mandrel is formed from a pipe. Shapes S and T are placed on the mandrel and secured to shapes Q and R.

Refractory castable is installed around shapes S and T to fill in the opening previously made in the reformer liner. The lining should be made flush with the butt end of shape T. After the castable has set and hardened, the mandrel is removed by cutting in half with a cutting torch.

From inside the waste heat boiler the refractory lining in the cone area is replaced. Sleeve 206 is placed on the male flange of Shape I. A cone liner 200 is prepared which will fit snugly over the sleeve. After the cone liner has been put in place, four wooden blocks are placed on top of Shape I and then the gas distribution dome is set on top of the blocks. The blocks are present to assure that an expansion gap of about 1¼ inch is present in the finished structure. The support ring is then placed over the gas distributor and then welded to the gas distributor. Then the ring is also welded to the cone liner. The wooden blocks are then removed.

The water jacket is repaired and the temperature and pressure connections are made.

A commercial scale transfer line prepared as above described has been placed in operation and is performing satisfactorily, with no pressure leaks or noticeable deterioration.

What is claimed is:

1. A method of forming a heat resistant gas transfer line comprising a tubular metal outer shell, a tubular inner liner formed of a plurality of prefired refractory rings joined together by shiplap joints having expansion gaps, and an intermediate liner comprising bubble alumina concrete filling the annular space between said inner liner and said outer shell; said method comprising placing on the inside lower surface of said outershell a plurality of bubble alumina concrete forms capable of supporting the refractory rings in the desired location within said outer shell, securing decomposable rings to the refractory rings in the area where the shiplap joints are to be so that a suitable expansion gap will be provided in the shiplap joints when the combustible rings are destroyed, assembling the refractory rings having the decomposable rings secured there on said concrete forms to form said tubular inner liner, filling in the annular area between said inner liner and said outer shell with bubble alumina castable, curing the castable to form bubble alumina concrete, and destroying said decomposable rings by combustion.

2. A method according to claim 1 wherein said transfer line is formed by securing only a portion of the total length of the inner liner on a portion of said forms, forming bubble alumina concrete in the annular area surrounding that section of the inner liner, then securing another portion of the inner liner on another portion of said forms and forming bubble alumina concrete in the annular area surrounding that section of the inner liner.

3. A method according to claim 2 wherein said bubble alumina concrete forms are formed in place within said metal outer shell by pouring bubble alumina castable cement into suitable removable molding forms positioned in said outer shell and then curing said castable cement.

* * * * *